(12) United States Patent
Kondo et al.

(10) Patent No.: US 11,162,152 B2
(45) Date of Patent: Nov. 2, 2021

(54) BEARING BUSHING FOR TRACK, AND METHOD FOR PRODUCING THE SAME

(71) Applicant: KOMATSU LTD., Tokyo (JP)

(72) Inventors: Yusuke Kondo, Tokyo (JP); Kazuo Maeda, Tokyo (JP); Eiji Amada, Tokyo (JP)

(73) Assignee: KOMATSU LTD., Tokyo (JP)

( * ) Notice: Subject to any disclaimer, the term of this patent is extended or adjusted under 35 U.S.C. 154(b) by 203 days.

(21) Appl. No.: 16/345,350

(22) PCT Filed: Dec. 20, 2017

(86) PCT No.: PCT/JP2017/045676
§ 371 (c)(1),
(2) Date: Apr. 26, 2019

(87) PCT Pub. No.: WO2018/123758
PCT Pub. Date: Jul. 5, 2018

(65) Prior Publication Data
US 2019/0316220 A1    Oct. 17, 2019

(30) Foreign Application Priority Data
Dec. 28, 2016    (JP) .............................. JP2016-255861

(51) Int. Cl.
*C21D 9/40*    (2006.01)
*F16C 17/02*    (2006.01)
(Continued)

(52) U.S. Cl.
CPC .............. *C21D 9/40* (2013.01); *B23P 15/003* (2013.01); *B62D 55/21* (2013.01); *C21D 1/10* (2013.01);
(Continued)

(58) Field of Classification Search
CPC ... C21D 9/40; C21D 1/18; C21D 1/10; C21D 6/002; C21D 6/005; C21D 6/008;
(Continued)

(56) References Cited

U.S. PATENT DOCUMENTS 3,567,529 A * 3/1971 Burtnett ................... C21D 9/08
148/571
4,126,359 A * 11/1978 Holze .................. B62D 55/092
305/103
(Continued)

FOREIGN PATENT DOCUMENTS

AU    2014284574 A1 *  2/2016    ............... C21D 1/42
CN       101626945 A      1/2010
(Continued)

OTHER PUBLICATIONS

Mar. 20, 2018 International Search Report issued in International Patent Application No. PCT/JP2017/045676.

*Primary Examiner* — Marcus Charles
(74) *Attorney, Agent, or Firm* — Oliff PLC

(57) ABSTRACT

A bearing bushing for a track has an annular shape including an inner peripheral surface, an outer peripheral surface, a first end face, and a second end face located axially opposite the first end face. The bearing bushing for a track includes an inner peripheral surface-side hardened layer formed to include the inner peripheral surface, an outer peripheral surface-side hardened layer formed to include the outer peripheral surface, a first end face-side hardened layer formed to include the first end face and having a region with a hardness of 63 HRC or more that has a thickness of 3 mm or more from the first end face, and an unhardened region lower in hardness than the inner peripheral surface-side
(Continued)

hardened layer, the outer peripheral surface-side hardened layer, and the first end face-side hardened layer, and including at least the second end face. The bearing bushing is made of steel.

15 Claims, 8 Drawing Sheets

(51) Int. Cl.
  *B23P 15/00* (2006.01)
  *B62D 55/21* (2006.01)
  *C21D 1/18* (2006.01)
  *C22C 38/32* (2006.01)
  *C21D 1/10* (2006.01)
  *C22C 38/22* (2006.01)
  *C22C 38/04* (2006.01)
  *C22C 38/02* (2006.01)
  *C22C 38/00* (2006.01)
  *C21D 6/00* (2006.01)
  *F16C 33/06* (2006.01)

(52) U.S. Cl.
  CPC .............. *C21D 1/18* (2013.01); *C21D 6/002* (2013.01); *C21D 6/005* (2013.01); *C21D 6/008* (2013.01); *C22C 38/002* (2013.01); *C22C 38/02* (2013.01); *C22C 38/04* (2013.01); *C22C 38/22* (2013.01); *C22C 38/32* (2013.01); *F16C 17/02* (2013.01); *F16C 33/06* (2013.01); *C21D 2221/00* (2013.01); *F16C 2202/04* (2013.01); *F16C 2326/20* (2013.01)

(58) Field of Classification Search
  CPC ........ B23P 15/003; F16C 17/02; F16C 25/02; F16C 33/06; F16C 33/14; F16C 2202/04; F16C 2223/10; F16C 2326/20; B62D 55/21
  USPC ........................ 384/129, 138, 261, 276, 282; 305/199–200; 403/404; 148/238, 570, 148/545
  See application file for complete search history.

(56) References Cited

U.S. PATENT DOCUMENTS

| | | | | |
|---|---|---|---|---|
| 4,423,910 A | * | 1/1984 | Narang | B62D 55/20 305/100 |
| 5,183,318 A | | 2/1993 | Taft et al. | |
| 5,249,868 A | * | 10/1993 | Watts | B62D 55/205 148/570 |
| 6,402,862 B1 | | 6/2002 | Anderton et al. | |
| 6,739,680 B2 | * | 5/2004 | Hasselbusch | B62D 55/21 305/103 |
| 7,638,005 B2 | * | 12/2009 | Takayama | C21D 1/62 148/567 |
| 8,851,582 B2 | * | 10/2014 | Grenzi | B62D 55/21 305/201 |
| 9,126,645 B2 | * | 9/2015 | Hasselbusch | B62D 55/0887 |
| 9,434,425 B2 | * | 9/2016 | Kaufmann | B62D 55/21 |
| 9,604,681 B2 | * | 3/2017 | Diekevers | B62D 55/0887 |
| 9,623,920 B2 | * | 4/2017 | Akinlua | B62D 55/0887 |
| 9,790,578 B2 | * | 10/2017 | Amada | C22C 38/02 |
| 2004/0164614 A1 | * | 8/2004 | Takayama | C21D 9/14 305/202 |
| 2010/0090523 A1 | | 4/2010 | Grenzi | |
| 2011/0135383 A1 | | 6/2011 | Recker et al. | |
| 2015/0361534 A1 | | 12/2015 | Amada et al. | |
| 2018/0099708 A1 | * | 4/2018 | Johannsen | C21D 1/10 |

FOREIGN PATENT DOCUMENTS

| | | | | |
|---|---|---|---|---|
| CN | 102575773 A | | 7/2012 | |
| CN | 202413977 U | | 9/2012 | |
| CN | 103276181 A | | 9/2013 | |
| CN | 103321262 A | | 9/2013 | |
| CN | 105121686 A | | 12/2015 | |
| JP | 03166320 A | * | 7/1991 | .............. C21D 9/40 |
| JP | H06-504747 A | | 6/1994 | |
| JP | 2002-114177 A | | 4/2002 | |
| JP | 2003342636 A | * | 12/2003 | .............. C21D 9/00 |
| JP | 4311912 B2 | * | 8/2009 | ........... Y02P 10/353 |
| JP | 2013-508554 A | | 3/2013 | |
| KR | 10-2016-0039329 A | | 4/2016 | |
| WO | WO-2009051674 A1 | * | 4/2009 | ........... B62D 55/145 |
| WO | 2014/185337 A1 | | 11/2014 | |

* cited by examiner

BEARING BUSHING FOR TRACK, AND METHOD FOR PRODUCING THE SAME

CROSS REFERENCE TO RELATED APPLICATION

This application is a 371 of International Application No. PCT/JP2017/045676, filed Dec. 20, 2017.

TECHNICAL FIELD

The present invention relates to a bearing bushing for a track, and a method for producing the same.

BACKGROUND ART

Track travel devices equipped with a track are used as travel devices for work machines such as hydraulic excavators and bulldozers. The track includes a plurality of track links connected in the form of ring, and track shoes secured to the track links. Each track link has a through hole formed therein. A pair of adjacent track links are arranged such that they partially overlap each other in the circumferential direction of the track. The through holes of the adjacent track links are aligned as seen from the direction perpendicular to the rotational plane of the track. A track pin is inserted to penetrate through the through holes. A bushing for a track is disposed to surround the outer periphery of the track pin. The track is engaged with a rotating sprocket wheel, so that the track is driven in a circumferential direction. At this time, the track and the sprocket wheel are engaged as the sprocket wheel comes into contact with the bushings for the track. The sprocket wheel and the bushings for the track are in sliding contact with each other. This causes wear of the bushings for the track. In the conventional track, the wear of the bushings for the track determines the life of the track.

There has been proposed a structure in which a rotatable bushing that is rotatable circumferentially relative to the track pin is disposed in a portion that comes into contact with the sprocket wheel. This structure adopts bearing bushings which are located between the track pin and corresponding track links and which are secured to the track pin so as to sandwich the rotatable bushing therebetween (see, for example, Japanese Patent Application Publication (Translation of PCT Application) No. H06-504747 (Patent Literature 1)). Adopting such a structure can extend the life of the track.

CITATION LIST

Patent Literature

Patent Literature 1: Japanese Patent Application Publication (Translation of PCT Application) No. H06-504747

SUMMARY OF INVENTION

Technical Problem

However, the life of the track may not be extended sufficiently even when the structure including the rotatable bushings as described above is adopted.

In view of the foregoing, one of the objects of the present invention is to provide a bearing bushing for a track capable of extending the life of the track and a method for producing the bearing bushing.

Solution to Problem

A bearing bushing for a track according to the present invention is made of steel. This bearing bushing for a track has an annular shape including an inner peripheral surface, an outer peripheral surface, a first end face, and a second end face located axially opposite the first end face. This bearing bushing for a track includes an inner peripheral surface-side hardened layer, an outer peripheral surface-side hardened layer, a first end face-side hardened layer, and an unhardened region. The inner peripheral surface-side hardened layer is formed to include the inner peripheral surface. The outer peripheral surface-side hardened layer is formed to include the outer peripheral surface. The first end face-side hardened layer is formed to include the first end face, and has a region with a hardness of 63 HRC or more having a thickness of 3 mm or more from the first end face. The unhardened region is lower in hardness than the inner peripheral surface-side hardened layer, the outer peripheral surface-side hardened layer, and the first end face-side hardened layer, and includes at least the second end face.

According to the bearing bushing for a track of the present invention, it is possible to extend the life of the track.

A method for producing a bearing bushing for a track according to the present invention includes: a step of preparing a material ring made of steel, a step of forming a heated region, a step of quench-hardening a part of the material ring, and a step of tempering the material ring. In the step of preparing a material ring, the material ring made of steel and having an annular shape including an inner peripheral surface, an outer peripheral surface, a first end face, and a second end face located axially opposite the first end face is prepared. In the step of forming a heated region, the heated region that is heated to a temperature of not lower than the $A_1$ transformation point of the steel is formed to include the inner peripheral surface, the outer peripheral surface, and the first end face of the material ring. In the step of quench-hardening a part of the material ring, a part of the material ring is quench-hardened by cooling the heated region from the temperature of not lower than the $A_1$ transformation point to a temperature range of not higher than the $M_s$ point. In the step of tempering the material ring, the partially quench-hardened material ring is heated to a temperature of lower than the $A_1$ transformation point, to temper the material ring such that the ring has a region with a hardness of 63 HRC or more having a thickness of 3 mm or more from the first end face.

According to the method for producing the bearing bushing for a track of the present invention, it is possible to readily produce the bearing bushing for a track of the present invention while avoiding the problem of softening of a previously formed hardened layer that may occur when a plurality of hardened layers are formed sequentially.

Effects of the Invention

According to the bearing bushing for a track and its producing method of the present invention, it is possible to provide the bearing bushing for a track capable of extending the life of the track and the method for producing the bearing bushing.

DESCRIPTION OF EMBODIMENTS

Figure 1:
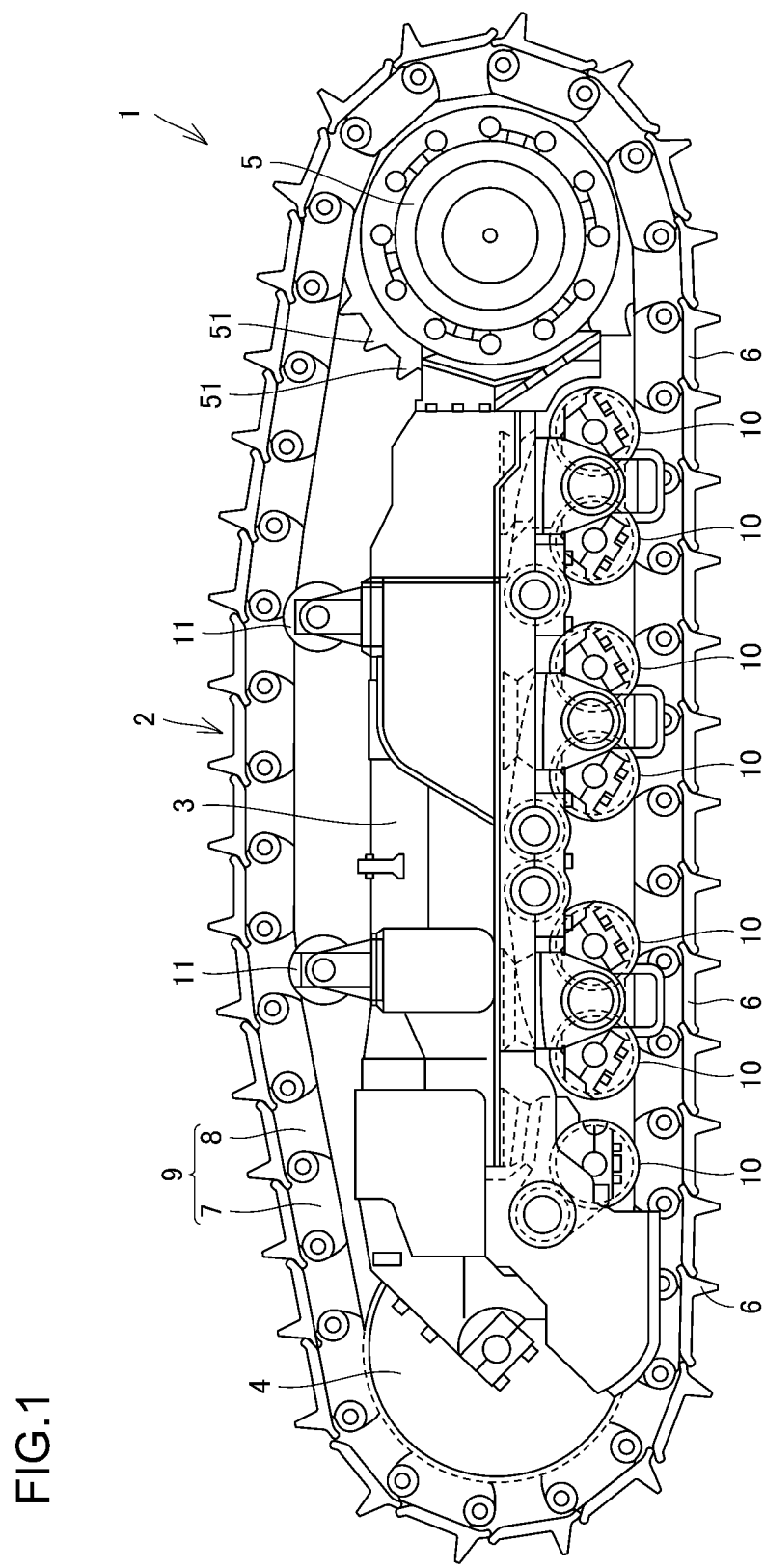
FIG. 1 is a schematic view showing the structure of a track travel device.

An embodiment of the present invention will now be described. In the following drawings, the same or corresponding parts are denoted by the same reference numerals, and the description thereof will not be repeated.

A bearing bushing of the present invention can be used, for example, in a track travel device as described below. Referring to FIG. 1, the track travel device 1 according to the present embodiment is a travel device for a working vehicle such as a large-sized bulldozer, and includes: a track 2; a track frame 3; an idler tumbler 4; a sprocket wheel 5; a plurality of (here, seven) track rollers 10; and a plurality of (here, two) carrier rollers 11.

Figure 2:
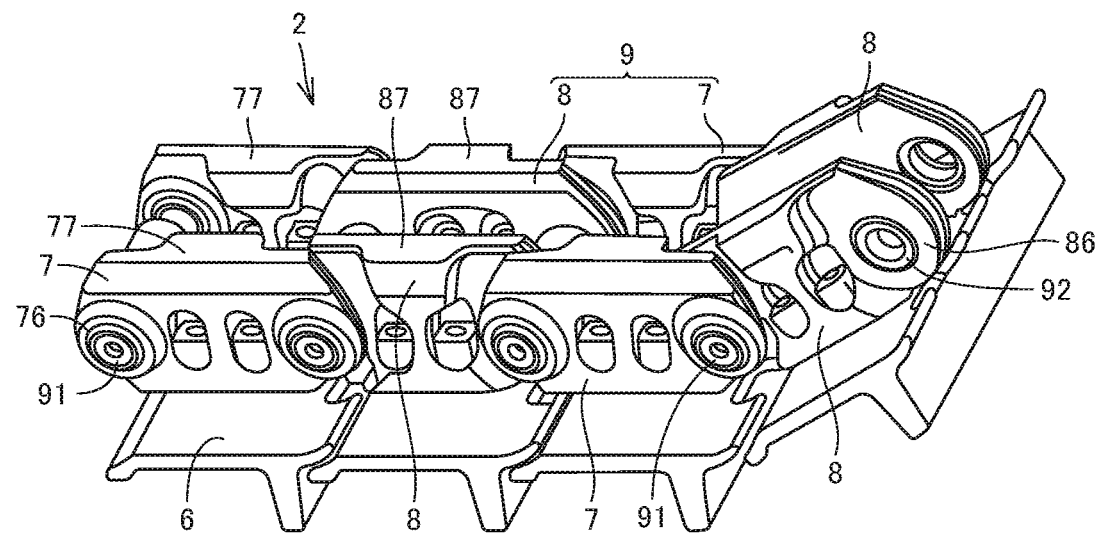
FIG. 2 is a schematic perspective view showing a part of the structure of a track.
Figure 3:
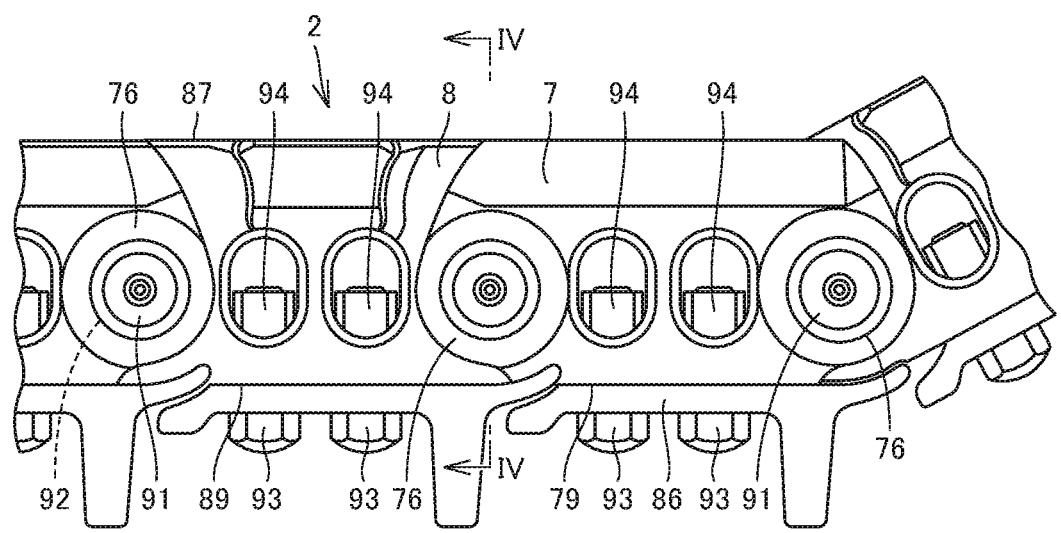
FIG. 3 is a schematic plan view showing a part of the structure of the track.

The track 2 includes a plurality of track links 9, which are connected endlessly, and track shoes 6, which are secured to the corresponding track links 9. The track links 9 include outer links 7 and inner links 8. The outer links 7 and the inner links 8 are connected alternately. Referring to FIGS. 2 and 3, each track shoe 6 is fixed to track shoe securing surfaces 79, 89 of a pair of outer links 7 or a pair of inner links 8. This forms two rows of links each made up of the alternately arranged outer links 7 and inner links 8.

Referring to FIG. 1, the idler tumbler 4, the plurality of (here, seven) track rollers 10, and the plurality of (here, two) carrier rollers 11 are attached to the track frame 3 in such a manner that they are rotatable about their respective axes. The sprocket wheel 5 is arranged on the side of one end of the track frame 3 and attached to a vehicle body (not shown). A power source such as an engine is connected to the sprocket wheel 5, and the sprocket wheel 5, being driven by the power source, rotates about its axis. On an outer peripheral surface of the sprocket wheel 5, a plurality of sprocket teeth 51 are arranged, which are projections protruding radially outward. Each sprocket tooth 51 is engaged with the track 2, causing the rotation of the sprocket wheel 5 to be transmitted to the track 2. As a result, the track 2 rotates in a circumferential direction, being driven by the rotation of the sprocket wheel 5.

The idler tumbler 4 is attached to the other end (opposite to the side where the sprocket wheel 5 is arranged) of the track frame 3. The track rollers 10 and the carrier rollers 11 are attached to the track frame 3 in the region sandwiched between the sprocket wheel 5 and the idler tumbler 4, on the ground contact side and on the side opposite to the ground contact side, respectively. The idler tumbler 4, the track rollers 10, and the carrier rollers 11 have their outer peripheral surfaces coming into contact with the inner peripheral surface of the track 2. As a result, the track 2, driven by the rotation of the sprocket wheel 5, rotates in a circumferential direction while being guided by the idler tumbler 4, the sprocket wheel 5, the track rollers 10, and the carrier rollers 11.

The structure of the track 2 will now be described in detail. Referring to FIGS. 2 and 3, each track shoe 6 is fastened and secured to outer links 7 or inner links 8 by bolts 93 and nuts 94. An outer link 7 and an inner link 8 adjacent to each other are arranged such that they partially overlap each other as seen from the direction perpendicular to the rotational plane of the track 2 (as seen in the viewpoint of FIG. 3), and they are connected using a track pin 91 and a bushing 20.

Figure 4:
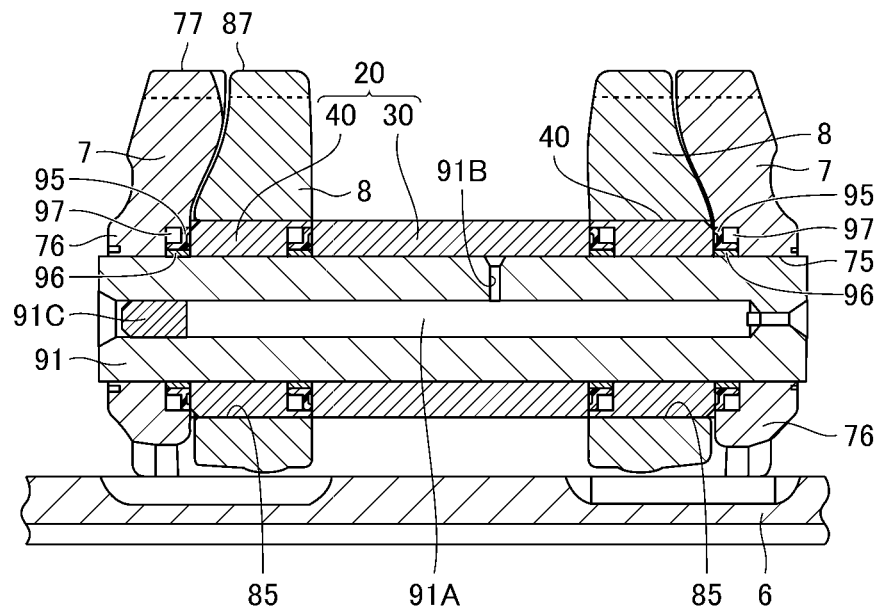
FIG. 4 is a schematic cross-sectional view taken along the line IV-IV in FIG. 3.

More specifically, referring to FIGS. 2 to 4, each inner link 8 has two bushing holes 85 formed to penetrate in the direction perpendicular to the rotational plane of the track 2. Of these two bushing holes 85, one bushing hole 85 and the other bushing hole 85 are formed at one end and the other end, respectively, in the longitudinal direction of the inner link 8. Further, the inner link 8 has a rail surface 87 formed on its side opposite to the side on which the track shoe 6 is attached. Each outer link 7 has two track pin holes 75 formed to penetrate in the direction perpendicular to the rotational plane of the track 2. Of these two track pin holes 75, one track pin hole 75 and the other track pin hole 75 are formed at one end and the other end, respectively, in the longitudinal direction of the outer link 7. Further, the outer link 7 has a rail surface 77 formed on its side opposite to the side on which the track shoe 6 is attached.

A pair of outer links 7 to which a track shoe 6 is secured are arranged in such a manner that their two track pin holes 75 are aligned respectively as seen from the direction perpendicular to the rotational plane of the track 2. Similarly, a pair of inner links 8 to which a track shoe 6 is secured are arranged in such a manner that their two bushing holes 85 are aligned respectively as seen from the direction perpendicular to the rotational plane of the track 2. Further, the outer links 7 and the inner links 8 adjacent to each other are arranged in such a manner that the track pin holes 75 and the bushing holes 85 are aligned as seen from the direction perpendicular to the rotational plane of the track 2. Then, referring to FIG. 4, a track pin 91 is disposed in such a way as to penetrate through the track pin hole 75 of the outer link 7 belonging to one row, the bushing hole 85 of the inner link 8 belonging to the one row, the bushing hole 85 of the inner link 8 belonging to the other row, and the track pin hole 75 of the outer link 7 belonging to the other row. The track pin 91 is press-fitted into the track pin holes 75, and its respective ends are caulked at bosses 76 of the corresponding outer links 7, whereby the pin is fixedly secured to the pair of outer links 7.

Referring to FIG. 4, a bushing 20 includes a pair of bearing bushings (fixed bushings) 40, and a rotatable bushing 30 disposed sandwiched between the pair of bearing bushings 40. The rotatable bushing 30 and the pair of bearing bushings 40 are each of a hollow cylindrical shape having a through hole in the region including its central axis. The rotatable bushing 30 and the pair of bearing bushings 40 are arranged such that their central axes coincide with each other. The bearing bushings 40 are fixedly secured as they are fitted into the bushing holes 85 of the corresponding inner links 8. The track pin 91 is disposed to penetrate through the through holes of the rotatable bushing 30 and the pair of bearing bushings 40. This allows the rotatable bushing 30 to rotate circumferentially relative to the track pin 91.

Further, referring to FIG. 4, the track pin 91 has a lubricant reservoir 91A, formed to extend axially in the region including the central axis of the pin, for storing a lubricant such as lubricating oil. The track pin 91 also has a lubricant passage 91B, formed to extend radially, for communication between the outer peripheral surface and the lubricant reservoir 91A. The lubricant reservoir 91A has an opening on one end face of the track pin 91, and a plug 91C is fitted into the opening. The lubricant such as lubricating oil is supplied from the opening of the lubricant reservoir 91A into the lubricant reservoir 91A and, with the plug 91C fitted into the opening, stored in the lubricant reservoir 91A. The lubricant inside the lubricant reservoir 91A is supplied via the lubricant passage 91B to between the outer peripheral surface of the track pin 91 and the inner peripheral surface of the rotatable bushing 30. This alleviates the friction between the outer peripheral surface of the track pin 91 and the inner peripheral surface of the rotatable bushing 30, and suppresses the wear of the outer peripheral surface of the track pin 91 and the inner peripheral surface of the rotatable bushing 30.

Arranged between the bearing bushing 40 and the outer link 7 are a spacer ring 96, a seal 95, and a load ring 97. The seal 95 is pressed against one end face of the bearing bushing 40 by the load ring 97. With this, the lubricant between the outer peripheral surface of the track pin 91 and the inner peripheral surface of the rotatable bushing 30 is prevented from leaking to the outside. The track 2 is a rotatable bushing type track having the above-described structure including the rotatable bushings 30.

In the track travel device 1, when the rotation of the sprocket wheel 5 is to be transmitted to the track 2, the sprocket teeth 51 are engaged with the bushings 20 attached to the track links 9. In a track travel device equipped with a conventional track having no rotatable bushings 30, the engagement of the sprocket teeth with the bushings causes wear of the outer peripheral surfaces of the bushings, which would often determine the life of the track travel device or the parts replacement cycles. In contrast, in the track travel device 1 equipped with the rotatable bushing type track, the sprocket teeth 51 are engaged with the rotatable bushings 30 which are rotatable with respect to the track pins 91. It is expected that this leads to longer lives of the rotatable bushings 30. However, if the bearing bushings of the present invention, which will be described later by giving an example, were not adopted, earth and sand that penetrate between an outer link 7 and an inner link 8 would reach between the bearing bushing 40 and the seal 95. If the track travel device 1 is operated in this state, the penetrated earth and sand would abrade that end face of the bearing bushing 40 which is in contact with the seal 95, thereby forming wear grooves. The lubricant would leak through these wear grooves out of the region where the lubricant had been sealed by the close contact between the bearing bushing 40 and the seal 95. In such a case, the outer peripheral surface of the track pin 91 and the inner peripheral surface of the rotatable bushing 30 would suffer galling or the like, leading to a shortened life of the track travel device 1.

Figure 5:
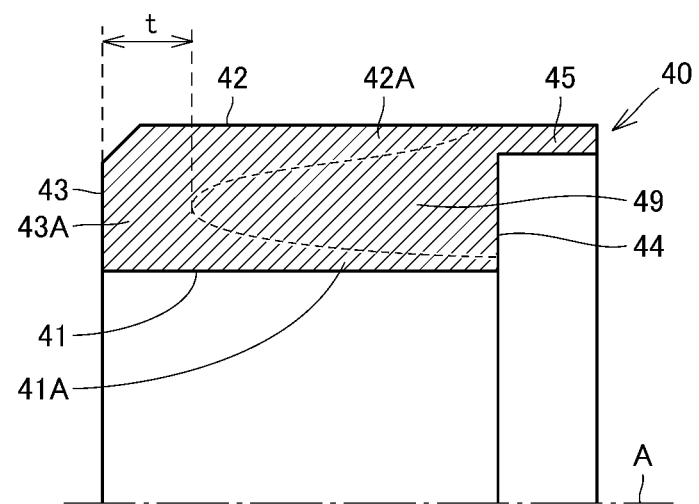
FIG. 5 is a schematic cross-sectional view showing the structure of a bearing bushing.

A description will now be given of the bearing bushing 40 of the present embodiment. FIG. 5 is a schematic cross-sectional view showing the state where the bearing bushing 40 is cut in a cross section including the central axis A. Referring to FIGS. 4 and 5, the bearing bushing 40 of the present embodiment is made of steel. The bearing bushing 40 has an annular shape including an inner peripheral surface 41, an outer peripheral surface 42, a first end face 43, and a second end face 44 that is located axially opposite the first end face 43.

The bearing bushing 40 includes an inner peripheral surface-side hardened layer 41A, an outer peripheral surface-side hardened layer 42A, a first end face-side hardened layer 43A, and an unhardened region 49. The inner peripheral surface-side hardened layer 41A is formed to include the inner peripheral surface 41. The outer peripheral surface-side hardened layer 42A is formed to include the outer peripheral surface 42. The first end face-side hardened layer 43A is formed to include the first end face 43. A region having a hardness of 63 HRC or more has a thickness t of 3 mm or more from the first end face 43.

The unhardened region 49 is lower in hardness than the inner peripheral surface-side hardened layer 41A, the outer peripheral surface-side hardened layer 42A, and the first end face-side hardened layer 43A. The hardness of the unhardened region 49 is 25 HRC or more and 40 HRC or less, for example. In the present embodiment, the unhardened region 49 is formed to include the second end face 44.

The second end face 44 has an axially protruding portion 45 formed thereon. The protruding portion 45 is formed to include the outer peripheral surface 42. The protruding portion 45 is formed in such a manner that a region of the bearing bushing 40 including the outer peripheral surface 42 extends in the axial direction. That is, in the bearing bushing 40, the outer peripheral surface 42 has a length in the axial direction longer than that of the inner peripheral surface 41. The protruding portion 45 is included in the unhardened region 49.

In the bearing bushing 40, the region other than the inner peripheral surface-side hardened layer 41A, the outer peripheral surface-side hardened layer 42A, and the first end face-side hardened layer 43A corresponds to the unhardened region 49. The inner peripheral surface-side hardened layer 41A, the outer peripheral surface-side hardened layer 42A, and the first end face-side hardened layer 43A are quench-hardened layers which are higher in hardness than the remaining, unhardened region 49. The inner peripheral surface-side hardened layer 41A, the first end face-side hardened layer 43A, and the outer peripheral surface-side hardened layer 42A are formed to extend continuously.

For the steel constituting the bearing bushing 40, a steel (carbon steel) containing carbon (C), silicon (Si), and manganese (Mn), with the balance consisting of iron (Fe) and unavoidable impurities, for example, may be adopted. The contents of the respective elements may be set for example as follows.

Carbon: not less than 0.55% by mass and not more than 0.90% by mass

Carbon is an element which greatly affects the steel hardness. If the carbon content is less than 0.55% by mass, it will be difficult to form, with quenching and tempering, a hardened layer that has a region with a hardness of 63 HRC or more and a thickness of 3 mm or more. On the other hand, if the carbon content exceeds 0.90% by mass, it will be difficult to impart sufficient toughness to the bearing bushing 40. It is thus preferable for the carbon content to fall within the above-described range.

Silicon: not less than 0.15% by mass and not more than 0.35% by mass

Silicon is an element which has a deoxidizing effect in the steelmaking process. If the silicon content is less than 0.15% by mass, the cost of the steelmaking process will increase. On the other hand, if silicon is added in an excessively large amount, toughness will decrease, so it is not preferable to add silicon more than necessary. It is thus preferable for the silicon content to fall within the above-described range.

Manganese: not less than 0.40% by mass and not more than 0.90% by mass

Manganese also is an element having a deoxidizing effect in the steelmaking process. Manganese also improves hardenability of the steel. If the manganese content is less than 0.40% by mass, the hardenability may become insufficient, or the cost of the steelmaking process may increase. On the other hand, if the manganese content exceeds 0.90% by mass, quenching crack may occur, or sulfide as a non-metal inclusion may be formed, leading to degraded properties of the bearing bushing 40. It is thus preferable for the manganese content to fall within the above-described range.

Phosphorus (P): not more than 0.020% by mass

Sulfur (S): not more than 0.020% by mass

Phosphorus and sulfur as unavoidable impurities are preferably contained in an amount of the above-described range from the standpoint of improved toughness of the bearing bushing 40.

The steel constituting the bearing bushing 40 may be one (alloy steel) which contains at least one of chromium (Cr) and molybdenum (Mo) in addition to the above components. The contents of the elements may be set for example as follows.

Chromium: not less than 0.40% by mass and not more than 1.30% by mass

Chromium improves hardenability of the steel. If the chromium content is less than 0.40% by mass, this effect cannot be exerted sufficiently. On the other hand, if the chromium content exceeds 1.30% by mass, quenching crack may occur. It is thus preferable for the chromium content to fall within the above-described range.

Molybdenum: not less than 0.15% by mass and not more than 0.50% by mass

Molybdenum improves hardenability of the steel. Molybdenum also contributes to improved toughness. If the molybdenum content is less than 0.15% by mass, the above effects cannot be exerted sufficiently. On the other hand, if the molybdenum content exceeds 0.5% by mass, the steel production cost will increase while the above effects will be enhanced only moderately. It is thus preferable for the molybdenum content to fall within the above-described range.

As explained above, the bearing bushing 40 according to the present embodiment has the first end face-side hardened layer 43A and the unhardened region 49 formed therein, the first end face-side hardened layer 43A being formed to include the first end face 43 and having a region with a hardness of 63 HRC or more that has a thickness of 3 mm or more from the first end face 43. With this, the region including the first end face 43 is improved in wear resistance, while acceptable toughness is being secured. Accordingly, even if earth and sand penetrate between the first end face 43 of the bearing bushing 40 and the seal 95, wear grooves are prevented from being formed on the first end face 43. As a result, the occurrence of for example galling of the outer peripheral surface of the track pin 91 and the inner peripheral surface of the rotatable bushing 30 due to the leakage of the lubricant oil is suppressed, leading to an extended life of the track 2. As seen from the above, the bearing bushing 40 of the present embodiment is a bearing bushing that is capable of extending the life of the track of even a large-sized work machine.

Figure 6:
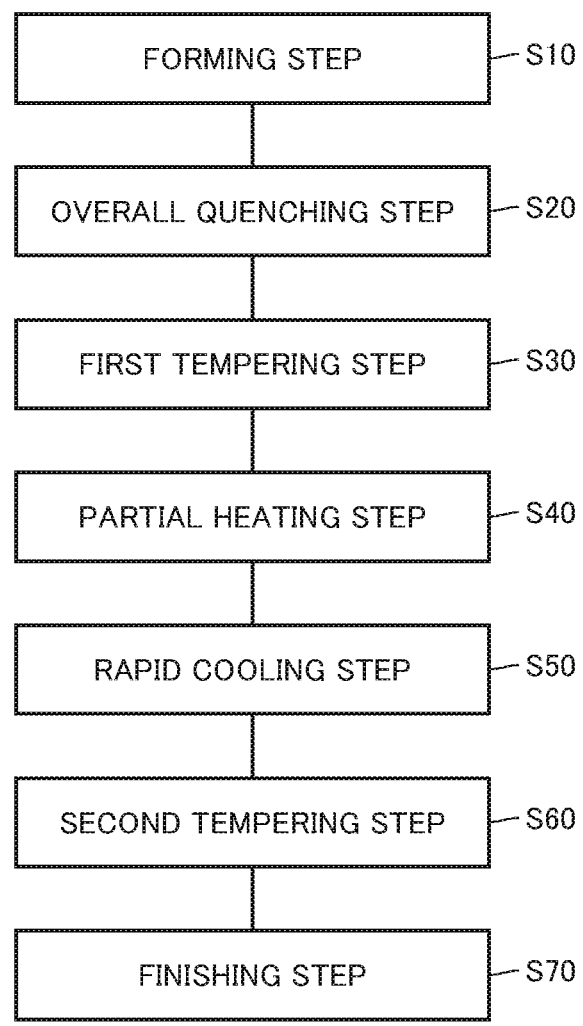
FIG. 6 is a flowchart schematically illustrating a method for producing a bearing bushing.

An exemplary method for producing the bearing bushing 40 of the present embodiment will now be described. Referring to FIG. 6, in the method for producing the bearing bushing 40 in the present embodiment, a forming step S10 is carried out first. In this step S10, a steel material of the above-described carbon steel or alloy steel, for example, is prepared and subjected to hot forging, cutting, and other processing, to obtain a material ring formed into a desired shape of the bearing bushing 40.

Next, an overall quenching step S20 is carried out. In this step S20, the entirety of the material ring obtained in the above step S10 is heated to a temperature of not lower than the $A_1$ transformation point of the steel constituting the material ring, and it is then cooled to a temperature of not higher than the $M_s$ point, for quenching. The material ring may be heated in an atmospheric furnace, for example.

Next, a first tempering step S30 is carried out. In this step S30, the entirety of the material ring that was quenched in the above step S20 is heated to a temperature range of lower than the $A_1$ transformation point of the steel constituting the material ring, and then cooled for tempering. More specifically, the material ring is heated to a temperature of not lower than 450° C. and not higher than 600° C. in a furnace, for example, and retained for a period of not shorter than 30 minutes and not longer than 180 minutes, and then cooled. In this manner, the entirety of the material ring is controlled to a hardness of not less than 25 HRC and not more than 40 HRC, for example. Although the steps S20 and S30 are optional, these steps when carried out allow the material ring as a whole to attain excellent toughness.

Next, a partial heating step S40 is carried out. In this step S40, a heated region is formed, which is heated to a temperature range of not lower than the $A_1$ transformation point of the steel, to include a part of the material ring tempered in the above step S30, or more specifically, to include the inner peripheral surface 41, the outer peripheral surface 42, and the first end face 43 of the ring. This partial heating may be performed by induction heating, for example. At this time, the region of the material ring including the second end face 44 is maintained in a temperature range of lower than the $A_1$ transformation point. The protruding portion 45 is also maintained in the temperature range of lower than the $A_1$ transformation point.

Next, a rapid cooling step S50 is carried out. In this step S50, the above-described heated region is cooled from the temperature range of not lower the $A_1$ transformation point to a temperature range of not higher than the $M_s$ point, for quench-hardening the part of the material ring. The cooling of the heated region may be performed by spraying cooling water onto the material ring, for example.

Figure 7:
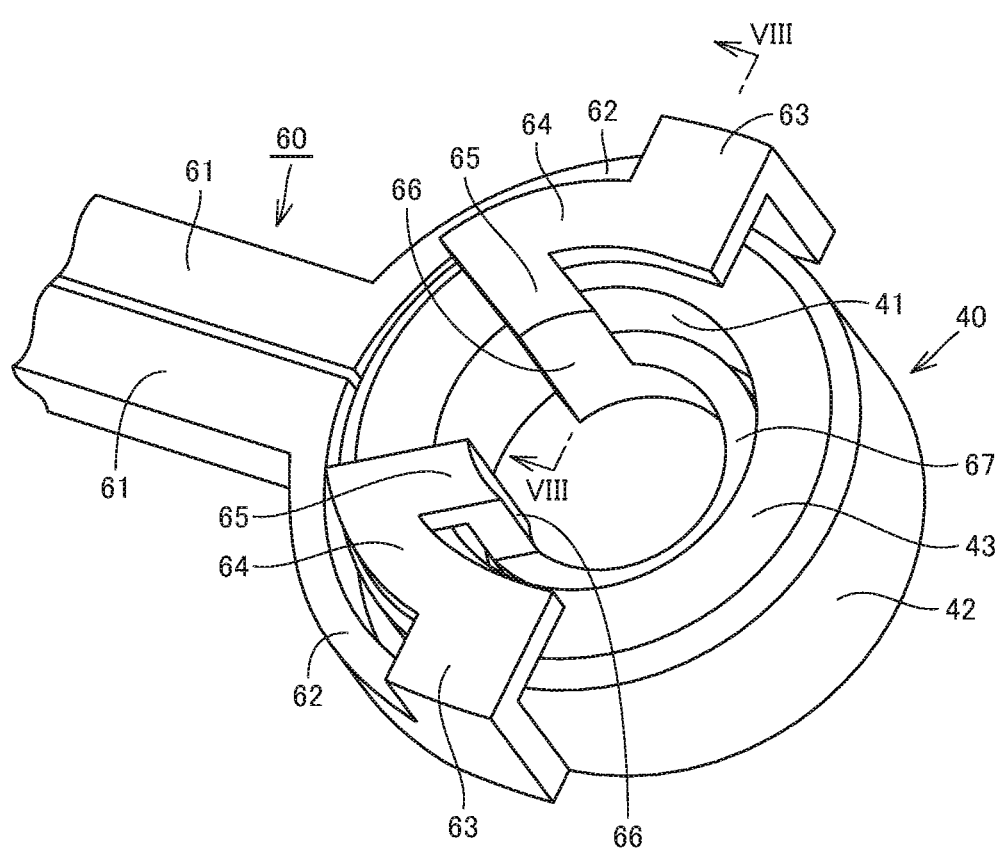
FIG. 7 is a schematic perspective view showing the structure of a coil of an induction hardening device.
Figure 8:
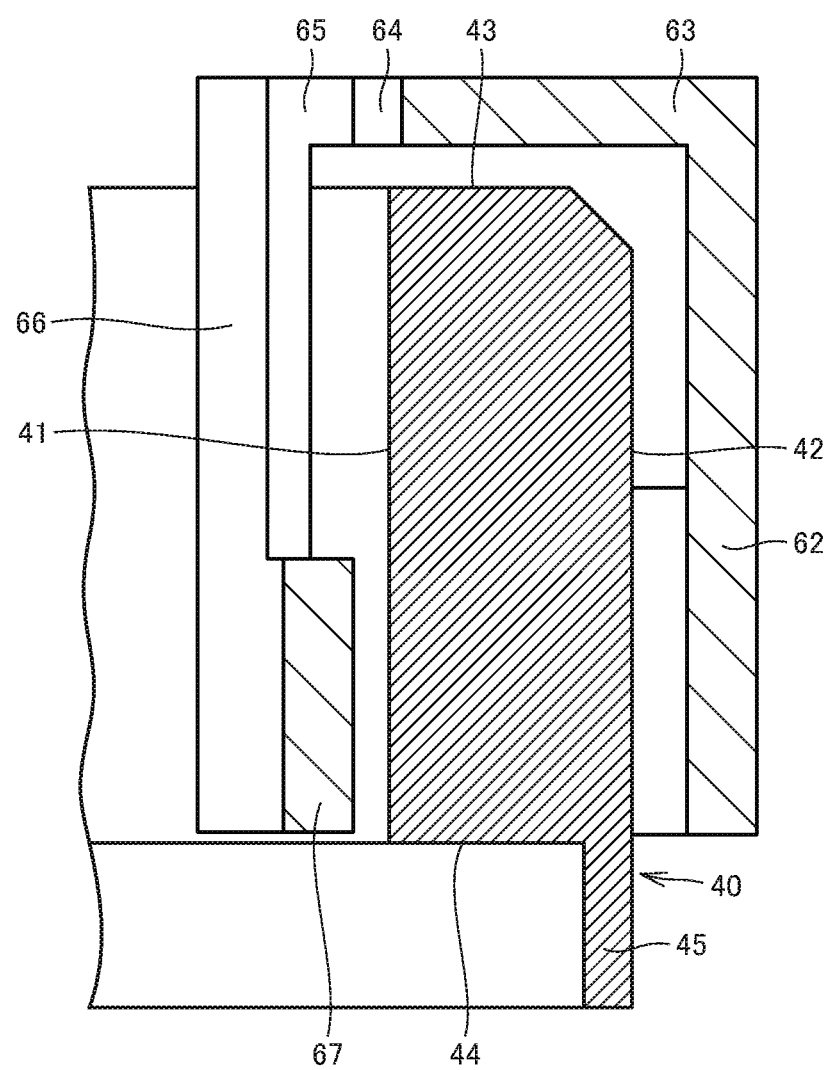
FIG. 8 is a schematic cross-sectional view showing the structure of the coil of the induction hardening device.

The steps S40 and S50 may be carried out using an induction hardening device as follows. FIG. 7 is a schematic perspective view showing the structure of a coil of an induction hardening device. FIG. 8 is a schematic cross-sectional view showing a cross section along the line VIII-VIII in FIG. 7.

Referring to FIGS. 7 and 8, the coil 60 of the induction hardening device of the present embodiment includes a pair of linear portions 61, a pair of outer peripheral surface heating portions 62, a pair of first connecting portions 63, a pair of first end face heating portions 64, a pair of second connecting portions 65, a pair of first inner peripheral surface heating portions 66, and a second inner peripheral surface heating portion 67.

The pair of linear portions 61, extending parallel to each other, are electrically connected to a power source (not shown). The pair of outer peripheral surface heating portions 62, connected to the pair of linear portions 61, are of arc shapes that extend in circumferentially opposite directions along the outer peripheral surface 42 of the bearing bushing (material ring) 40. The pair of first connecting portions 63, connected to the pair of outer peripheral surface heating portions 62, are of linear shapes that each extend along the first end face 43 of the bearing bushing (material ring) 40 radially inward of the first end face 43. The pair of first end face heating portions 64, connected to the pair of first connecting portions 63, are of arc shapes that each extend along the first end face 43 of the bearing bushing (material ring) 40 in a circumferential direction of the first end face 43 to approach the linear portion 61.

The pair of second connecting portions 65, connected to the pair of first end face heating portions 64, are of linear shapes that each extend radially inward of the bearing bushing (material ring) 40. The pair of first inner peripheral surface heating portions 66, connected to the pair of second connecting portions 65, are of shapes that each extend axially along the inner peripheral surface 41 of the bearing bushing (material ring) 40. The second inner peripheral surface heating portion 67 is of a shape that extends circumferentially along the inner peripheral surface 41 of the bearing bushing (material ring) 40 so as to connect the pair of first inner peripheral surface heating portions 66.

In the step S40, the bearing bushing (material ring) 40 is set in the induction hardening device having the above-described coil 60. More specifically, the bearing bushing (material ring) 40 is disposed in such a manner that the outer peripheral surface 42 of the bearing bushing (material ring) 40 faces the outer peripheral surface heating portions 62 of the coil 60, the first end face 43 faces the first connecting portions 63 and the first end face heating portions 64, and the inner peripheral surface 41 faces the first inner peripheral surface heating portions 66 and the second inner peripheral surface heating portion 67. Then, high-frequency current is made to flow through the coil 60 in the state where the bearing bushing (material ring) 40 is rotating circumferentially without changing the relative positional relationship with the coil 60. With this, the bearing bushing (material ring) 40 is induction-heated, whereby the above-described heated region is formed. Thereafter, in the step S50, current supply to the coil 60 is stopped, and cooling water is sprayed onto the bearing bushing (material ring) 40. That is, in the steps S40 and S50, the bearing bushing (material ring) 40 is partially quench-hardened by induction hardening.

Next, a second tempering step S60 is carried out. In this step S60, the material ring partially quenched in the steps S40 and S50 is heated to a temperature which is lower than the $A_1$ transformation point of the steel constituting the material ring and which is lower than the heating temperature in the above step S30, and then cooled for tempering. More specifically, the material ring is heated to a temperature of not lower than 100° C. and not higher than 300° C. in a furnace, for example, and retained for a period of not shorter than 30 minutes and not longer than 180 minutes, and then cooled. Through this step, the hardness of the region quenched in the steps S40 to S50, i.e. the inner peripheral surface-side hardened layer 41A, the outer peripheral surface-side hardened layer 42A, and the first end face-side hardened layer 43A, is controlled. At this time, the heating temperature and heating time are controlled to cause the region having a hardness of 63 HRC or more to have a thickness of 3 mm or more from the first end face 43.

Next, a finishing step S70 is carried out if necessary. In this step S70, finishing processing necessary for the material ring that has undergone the heat treatment in the above steps S20 to S60 is carried out. The bearing bushing 40 according to the present embodiment can be produced by the above-described process.

In the method for producing the bearing bushing 40 in the present embodiment, the material ring having the heated region formed to include the inner peripheral surface 41, the outer peripheral surface 42, and the first end face 43 of the material ring is cooled, so that the material ring is partially quench-hardened. It is then tempered to achieve appropriate hardness distribution. Therefore, according to the method for producing the bearing bushing 40 in the present embodiment, it is possible to readily produce the bearing bushing 40 while avoiding the problem of softening of a previously formed hardened layer that may occur when a plurality of hardened layers are formed sequentially. With induction heating adopted in the producing method of the present embodiment, it is possible to economically form the first end face-side hardened layer 43A that has a region with a hardness of 63 HRC or more having a thickness of 3 mm or more from the first end face 43.

EXAMPLES

A study was conducted to determine the steel(s) suitable for the bearing bushing of the present invention, and a sand abrasion test was also carried out to perform an experiment confirming improvement in wear resistance of the bearing bushing of the present invention. The procedure of the experiment was as follows.

First, steel materials having the component compositions shown in Table 1 were prepared. Then, disks having a diameter of 90 mm and a thickness of 30 mm were formed with the steel materials. Each disk was quenched as a whole, and then heated to 600° C. for tempering, to control the hardness of the disk as a whole to be from 25 HRC to 40 HRC. One end face side of the disk was subjected to induction hardening, and then tempered at 150° C. to produce a sample. It should be noted that for the sample E, instead of the overall quenching and tempering at 600° C., spheroidizing annealing was performed, which was followed by the induction hardening. As to the sample G, instead of the induction hardening and tempering at 150° C., the sample was subjected to overall heating and then oil quenching, and it was tempered at 160° C. This sample G is made of the same material as the sample B. The sample G assumes a conventional bearing bushing.

TABLE 1

|  | C | Si | Mn | P | S | Cr | Mo | B | Fe | Hardening Method | Tempering Temperature | Note |
|---|---|---|---|---|---|---|---|---|---|---|---|---|
| Sample A | 0.66 | 0.31 | 0.82 | 0.009 | 0.009 | 1.19 | 0.15 | — | Bal. | Induction Hardening | 150° C. | Inventive Examples |
| Sample B | 0.57 | 0.24 | 0.57 | 0.010 | 0.006 | 0.48 | 0.47 | — | Bal. | | | |
| Sample C | 0.58 | 0.27 | 0.81 | 0.010 | 0.009 | 0.82 | 0.30 | — | Bal. | | | |
| Sample D | 0.85 | 0.26 | 0.45 | 0.018 | 0.003 | 0.21 | — | — | Bal. | | | |
| Sample E | 1.08 | 0.25 | 0.40 | 0.015 | 0.013 | 1.50 | — | — | Bal. | | | Comparative Examples |
| Sample F | 0.51 | 0.16 | 0.40 | 0.010 | 0.015 | 0.72 | — | 0.0017 | Bal. | | | |
| Sample G | 0.57 | 0.24 | 0.57 | 0.010 | 0.006 | 0.48 | 0.47 | — | Bal. | Overall Oil Quenching | 160° C. | |

Figure 9:
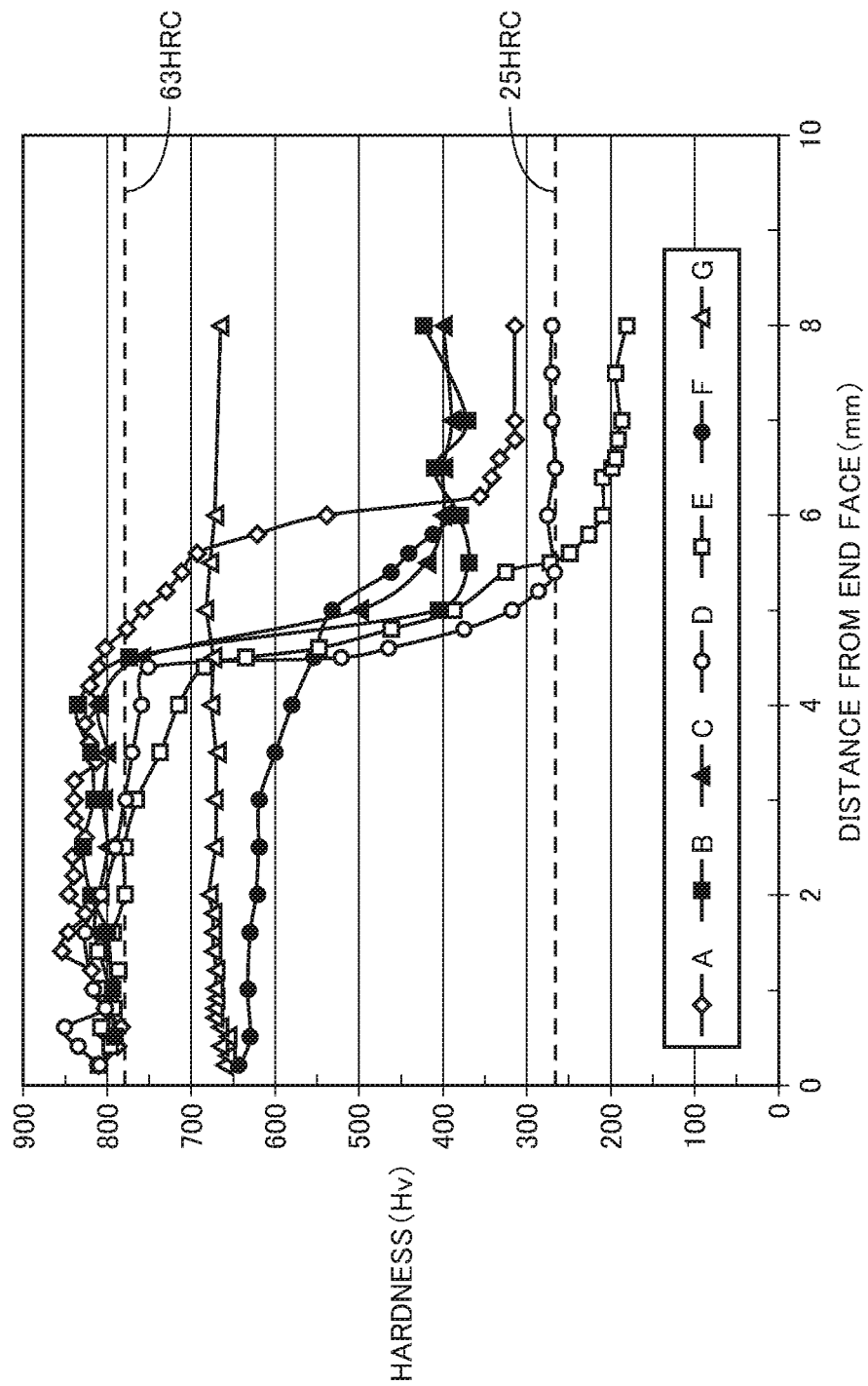
FIG. 9 shows hardness distribution of samples.

For the obtained samples A to hardness distribution in the depth direction from the one end face was examined. The results are shown in FIG. 9. In FIG. 9, the horizontal axis represents distance from the one end face, and the vertical axis represents hardness.

Referring to FIG. 9, it is found that the samples A, B, C, and D are those of the Inventive Examples which each have formed therein a hardened layer in which the region with a hardness of 63 HRC or more has a thickness of 3 mm or more from the end face. On the other hand, the samples E, F, and G are those of the Comparative Examples which fall outside the scope of the present invention.

For the samples A, D, and G among the above samples, test specimens were cut out to include the quench-hardened end face, and they were subjected to a sand abrasion test. Each test specimen was of a rectangular parallelepiped shape with a height of 30 mm, having an end face of a square shape with a 15 mm-long side that corresponds to the quench-hardened end face. This quench-hardened end face was pressed against an end face of a circumferentially rotating disk, and the amount of wear was checked at fixed time intervals. The end face of the disk had earth and sand sprinkled thereon. The test results are shown in FIG. 10.

Figure 10:
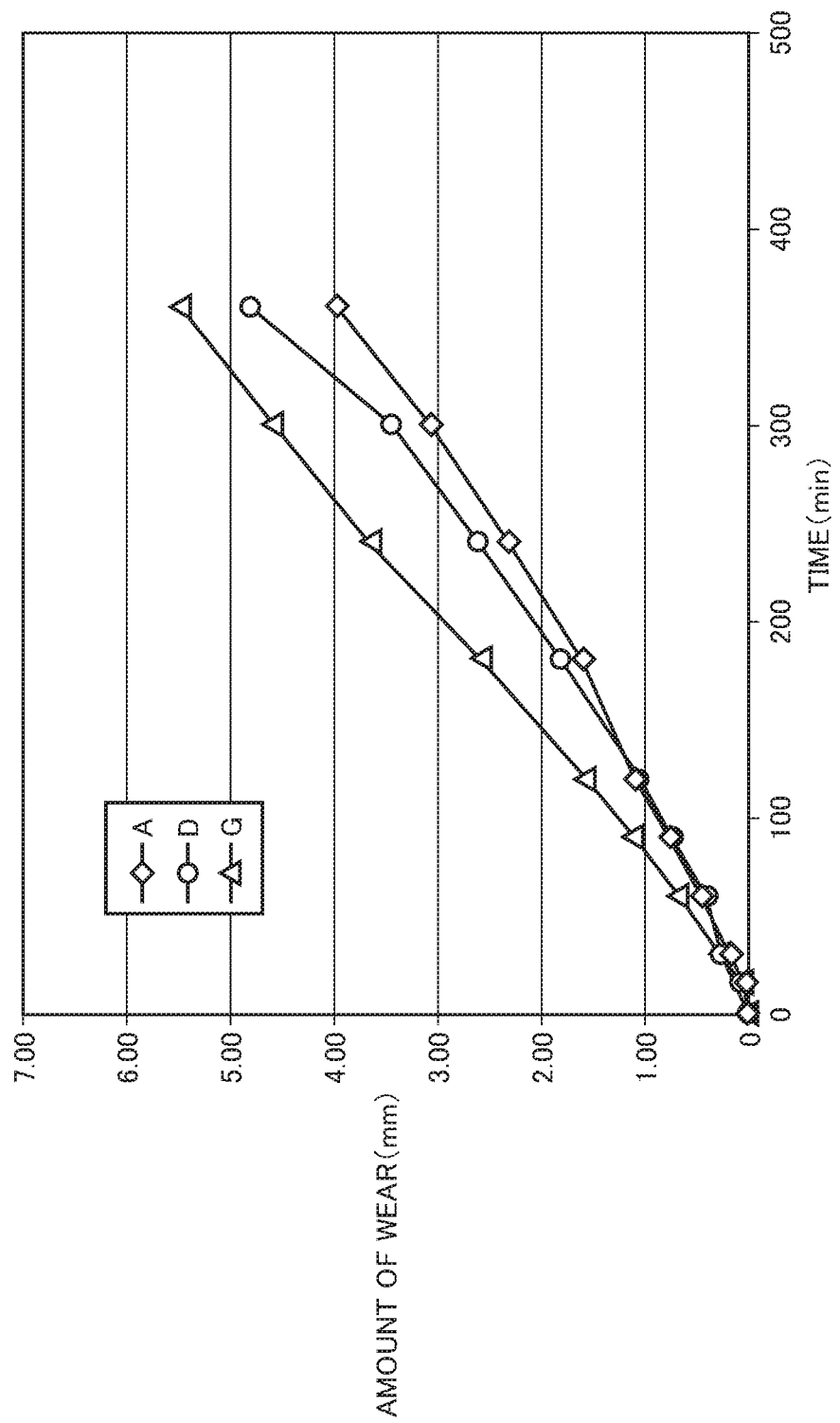
FIG. 10 shows results of a sand abrasion test.

In FIG. 10, the horizontal axis represents time during which a test specimen was pressed against the disk, and the vertical axis represents amount of wear. As explained above, the sample G assumes a conventional bearing bushing. Referring to FIG. 10, for the samples A and D corresponding to the Inventive Examples, the time taken for the wear to advance to the same depth as that in the sample G was about 1.5 times longer. That is, the wear resistance of the samples A and D corresponding to the Inventive Examples is about 1.5 times that of the sample G corresponding to the Comparative Example falling outside the scope of the present invention. This indicates that the bearing bushing of the present invention ensures considerably improved wear resistance, thereby promising a longer life of the track.

It should be understood that the embodiment and examples disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The bearing bushing and its producing method of the present invention are applicable particularly advantageously to the bearing bushing used for a track of a large-sized work machine requiring an extended life and to its producing method.

DESCRIPTION OF REFERENCE NUMERALS

1: track travel device; 2: track; 3: track frame; 4: idler tumbler; 5: sprocket wheel; 6: track shoe; 7: outer link; 8: inner link; 9: track link; 10: track roller; 11: carrier roller; 20: bushing; 30: rotatable bushing; 40: bearing bushing; 41: inner peripheral surface; 41A: inner peripheral surface-side hardened layer; 42: outer peripheral surface; 42A: outer peripheral surface-side hardened layer; 43: first end face; 43A: first end face-side hardened layer; 44: second end face; 45: protruding portion; 49: unhardened region; 51: sprocket tooth; 60: coil; 61: linear portion; 62: outer peripheral surface heating portion; 63: first connecting portion; 64: first end face heating portion; 65: second connecting portion; 66: first inner peripheral surface heating portion; 67: second inner peripheral surface heating portion; 75: track pin hole; 76: boss; 77: rail surface; 79: track shoe securing surface; 85: bushing hole; 87: rail surface; 91: track pin; 91A: lubricant reservoir; 91B: lubricant passage; 91C: plug; 93: bolt; 94: nut; 95: seal; 96: spacer ring; and 97: load ring.

The invention claimed is:

1. A bearing bushing for a track, the bushing having an annular shape including an inner peripheral surface, an outer peripheral surface, a first end face, and a second end face located axially opposite the first end face, the bearing bushing comprising:
   an inner peripheral surface-side hardened layer formed to include the inner peripheral surface;
   an outer peripheral surface-side hardened layer formed to include the outer peripheral surface;
   a first end face-side hardened layer formed to include the first end face, the layer having a region with a hardness of 63 HRC or more that has a thickness of 3 mm or more from the first end face; and
   an unhardened region, the region including at least the second end face;
   the bearing bushing being made of steel.

2. The bearing bushing for a track according to claim 1, wherein the unhardened region has a hardness of 25 HRC or more and 40 HRC or less.

3. The bearing bushing for a track according to claim 2, wherein
   the second end face has an axially protruding portion formed thereon, and
   the protruding portion is included in the unhardened region.

4. The bearing bushing for a track according to claim 3, wherein the first end face-side hardened layer is connected to the inner peripheral surface-side hardened layer and the outer peripheral surface-side hardened layer.

5. The bearing bushing for a track according to claim 2, wherein the first end face-side hardened layer is connected to the inner peripheral surface-side hardened layer and the outer peripheral surface-side hardened layer.

6. The bearing bushing for a track according to claim 1, wherein
   the second end face has an axially protruding portion formed thereon, and
   the protruding portion is included in the unhardened region.

7. The bearing bushing for a track according to claim 6, wherein the first end face-side hardened layer is connected to the inner peripheral surface-side hardened layer and the outer peripheral surface-side hardened layer.

8. The bearing bushing for a track according to claim 1, wherein the first end face-side hardened layer is connected to the inner peripheral surface-side hardened layer and the outer peripheral surface-side hardened layer.

9. The bearing bushing for a track according to claim 1, wherein the steel contains not less than 0.55% by mass and not more than 0.90% by mass of carbon.

10. A method for producing a bearing bushing for a track according to claim 1, the method comprising the steps of:
    preparing a material ring made of steel, the material ring having an annular shape including an inner peripheral surface, an outer peripheral surface, a first end face, and a second end face located axially opposite the first end face;

forming a heated region so as to include the inner peripheral surface, the outer peripheral surface, and the first end face of the material ring, the heated region being heated to a temperature of not lower than the $A_1$ transformation point of the steel;

quench-hardening a part of the material ring by cooling the heated region from the temperature of not lower than the $A_1$ transformation point to a temperature range of not higher than the $M_s$ point; and tempering the material ring by heating the partially quench-hardened material ring to a temperature range of lower than the $A_1$ transformation point to attain a region with a hardness of 63 HRC or more that has a thickness of 3 mm or more from the first end face.

11. The method for producing the bearing bushing for a track according to claim 10, wherein in the step of forming the heated region, a region of the material ring including the second end face is maintained in a temperature range of lower than the $A_1$ transformation point.

12. The method for producing the bearing bushing for a track according to claim 11, wherein
the second end face of the material ring has an axially protruding portion formed thereon, and
in the step of forming the heated region, the protruding portion is maintained in the temperature range of lower than the $A_1$ transformation point.

13. The method for producing the bearing bushing for a track according to claim 11, wherein the steel contains not less than 0.55% by mass and not more than 0.90% by mass of carbon.

14. The method for producing the bearing bushing for a track according to claim 12, wherein the steel contains not less than 0.55% by mass and not more than 0.90% by mass of carbon.

15. The method for producing the bearing bushing for a track according to claim 10, wherein the steel contains not less than 0.55% by mass and not more than 0.90% by mass of carbon.

* * * * *